United States Patent [19]

Stolzer

[11] Patent Number: 4,979,627

[45] Date of Patent: Dec. 25, 1990

[54] MATERIALS CARRIER IN THE MANNER OF A SUPPORT FOR RODS AND THE LIKE

[76] Inventor: Paul Stolzer, Franz-Xaver-Lender-Strasse 16, D-7590 Achern, Fed. Rep. of Germany

[21] Appl. No.: 311,249

[22] Filed: Feb. 15, 1989

[30] Foreign Application Priority Data

Feb. 24, 1988 [DE] Fed. Rep. of Germany ... 8802379[U]

[51] Int. Cl.⁵ ................................................. A47F 5/00
[52] U.S. Cl. .................................... 211/183; 211/183; 211/94.5; 108/52.1
[58] Field of Search ................ 211/183, 94.5, 94, 162, 211/151, 193, 70.4, 60.1; 108/52.1, 108, 102, 143; 414/267

[56] References Cited

U.S. PATENT DOCUMENTS

| | | | |
|---|---|---|---|
| 921,956 | 5/1909 | Danziger | 211/162 |
| 1,574,705 | 2/1926 | Sessions | 211/94.5 |
| 2,933,196 | 4/1960 | Childs | 211/183 |
| 3,014,597 | 12/1961 | McWherter | 211/175 |
| 3,567,039 | 3/1971 | Evans | 211/162 |
| 4,605,988 | 8/1986 | Nienhaus et al. | 211/126 X |
| 4,778,325 | 10/1988 | Stolzer et al. | 414/276 |

*Primary Examiner*—Blair M. Johnson
*Attorney, Agent, or Firm*—Edwin E. Greigg

[57] ABSTRACT

A self supporting carrier for rods, flat sheets, etc., comprising spaced end holders which are held in paralellism by a girder formed as a hollow with vertical aides. The ends of the girder are secured to a vertical wall of the end holders which are U-shaped with one horizontal side used to support the carrier on horizontal supports in a storage area. At least one vertical wall of the girder is provided with equaly spaced rows of apertures by which material supports are secured to the at least one vertical wall of the girder to extend outwardly therefrom between the end holders. One of the rows of apertures may be slotted vertically such as a bayonet type holder.

10 Claims, 5 Drawing Sheets

4,979,627

MATERIALS CARRIER IN THE MANNER OF A SUPPORT FOR RODS AND THE LIKE

BACKGROUND OF THE INVENTION

The invention relates to a materials carrier in the manner of a support for rods and the like that is self-supporting between its long ends. The long ends are embodied by identical vertical closure walls aligned with one another in the longitudinal direction of the materials carrier; horizontally extending holders protrude from the outside of the closure walls, so that the materials carrier can be set down on spaced horizontal shelf-support arms fastened to vertical posts, and so that the materials can be picked up and transported by a shelf service apparatus.

Materials carriers of this type are used for instance in the subject of U.S. Pat. No. 4,778,325, which relates to a storage system for rod-shaped material held in self-supporting carriers for rods and the like, with stacking frames disposed transversely to the direction of the storeroom and aligned with one another in the direction of the storeroom; the stacking frames in the manner of shelf systems are provided with adjacent rows of spaced support arms disposed one above the other, extending in the direction of the storeroom and secured to vertical supports, for the carriers. The storage system also has further shelves, embodied on support arms extending in the direction of the storeroom; rod-like material rests directly on these support arms. This storage apparatus is manipulated by a shelf service apparatus, described in detail in the aforementioned U.S. patent, by means of which both the rod-holding supports and the rod-like material resting loosely in the shelves can be moved to a destination and then either returned to storage, or stored at a new location provided for it. With a view to transporting of the rod-holding supports, the shelf service apparatus has a crane bridge that is movable in and extends crosswise to the storeroom direction and has raisable and lowerable load beams on both ends of the crane outside the shelf systems. Support means, extending crosswise to the storeroom direction and pointing with their free ends toward the stacking frames, are adjustable in the storeroom direction so as to be brought into load-bearing engagement, on both sides of the shelf system gangway, which thus forms the middle position, with the inside of the rod-holding supports, by means of holders protruding from the face ends of the support means.

However, for the rod-holding supports, the storeroom apparatus described above enables storage only of one type of material, in relatively large quantities of each material, so that if a great variety of material is to be kept on hand, the storage apparatus occupies considerable space and is suitable only for situations in which large quantities of material are needed.

Considering not only this problem, but also the shelves in which the material loosely rests, the vertical spacing between shelves disposed one above the other must inevitably be set for the maximum cross section of material to be stored, so that with material of smaller cross section, the shelves can accordingly not be filled full, so that some of the potential storeroom capacity is wasted.

Moreover, with storage systems of the type in question a certain amount of reserve capacity is typically provided for, even though some other location in the factory or the like may suffer a lack of storage capacity for products, such as metal sheets, small iron goods or the like, that are not rod-shaped.

OBJECT AND SUMMARY OF THE INVENTION

It is therefore an object of the invention to disclose a possibility for increasing the utilization of capacity in a storage apparatus of the above type, both in terms of various cross sections of rod-shaped material to be stored and in terms of the exploitation of reserve space for storing other products that are not in the form of rod-shaped material.

With a materials carrier of the above generic type as the point of departure, this object is attained in accordance with the invention in that the closure walls are self-supportingly connected to one another solely by a hollow-profiled girder having parallel vertical walls, and that this girder has carrier elements, oriented toward the space between the closure walls, for detachably fastening supports for the material.

By these provisions, a component in the manner of a carrier for rods and the like is created, such that the shelf service apparatus can place the carrier inside the storage system and move it, for instance to a materials retrieval and storage station, in the same manner as a rod-holding carrier of the known type. On the other hand, the materials carrier of the invention makes it possible to attach supports for materials of various kinds to the materials carrier in a detachable and hence adjustable and interchangeable manner, so that with the aid of the materials carrier of the invention, not only small quantities of rod-shaped material, but other materials of various types can be stored.

To this end, it may be provided that the closure walls are connected to one another on one of their vertical sides by the girder. In that case, one side of the girder is oriented toward the space between the closure walls, and there has the elements for detachably fastening repositores for the material.

In another case, it may be provided that the closure walls are connected to one another in the vicinity of their middle between their vertical sides by the ends of the girder, which is provided on both sides with the elements for detachably fastening supports for the material. It thus, also, becomes possible, for supports that are shorter in the direction of the space between the closure walls, to provide these supports on both sides of the vertical walls of the girder; this simultaneously makes it possible to dispose smaller quantities of material of the same type in the same position on both sides of the vertical wall, so that the shelf service apparatus can approach the carrier from both sides and thus handle the material from both sides.

To embody the materials carrier, it is practical for the girder to be embodied as a hollow-profiled metal girder. In this way, the materials carrier can be assembled conventionally and hence easily from conventional basic materials in the form of sheet metal, for instance by welding, so that from the standpoint of its particular form as well, the materials carrier of the invention can be provided in quite various forms; the sole condition to be met is that there be space for accommodating it within the dimensions of the storage sites for the known rod-holding carriers.

As for the elements for detachably fastening the material supports, they may be embodied by at least two rows of openings disposed one above the other, with the openings of at least one row, preferably a lower row, having a cross section that tapers toward the bottom. This makes it possible to suspend the material supports from the holes or to fasten them to the vertical wall with screws; in the case of the openings with a cross section that tapers toward the bottom, it is also possible to insert the material supports into the vertical wall in the manner of a bayonet mount, with the aid of bolts having heads.

In a further feature of the concept of the invention, it may also be provided that a web closing off the girder at the top is formed on the side of the girder oriented toward the space between the closure walls; it is likewise practical to provide this web with a row of openings. This makes it possible for suitably embodied material supports to be suspended from the top of the web by hooks provided on them; in that case, a further fastening to the girder may also be provided lower down, with the aid of screws.

Especially for the primary application, that is, storing rod-like material, it may be provided that the supports on the girder are vertically fastenable posts having support arms extending substantially horizontally into the space between the closure walls. Such supports may each have one or more support arms disposed one above the other, depending on the cross section of the rod-like material to be stored, so that even for storing small quantities of material of different cross sections, still every storage site intended for each rod-holding carrier can be fully utilized. This even makes it possible to provide materials carriers that in the vertical direction span more than one storage site for rod-holding carriers, so that even materials of larger dimensions, such as metal sheets or the like, can be kept on hand.

The invention will be better understood and further objects and advantages thereof will become more apparent from the ensuing detailed description of preferred embodiments taken in conjunction with the drawings.

DESCRIPTION OF THE PREFERRED EMBODIMENT

Figure 1:
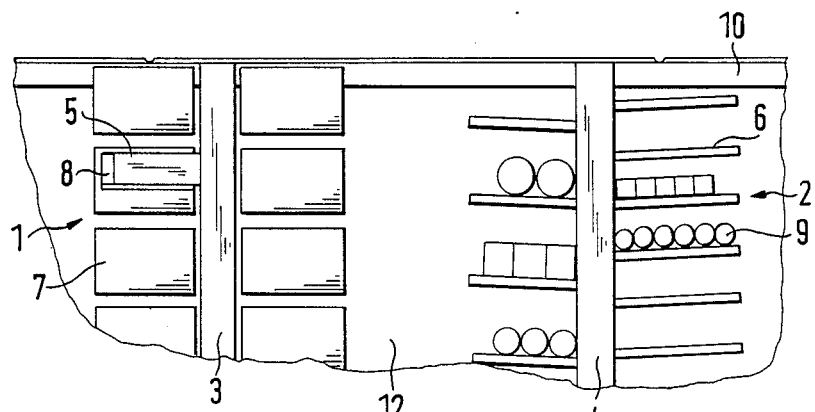
FIG. 1 is a fragmentary end view of the shelf systems of a storage apparatus.
Figure 2:
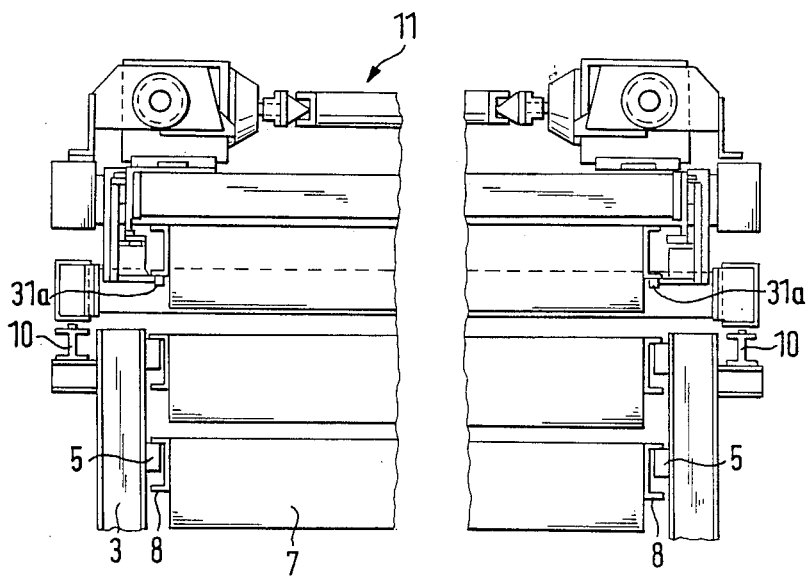
FIG. 2 is a side view of a shelf system for carriers for holding rods or the like, in the system of FIG. 1.

FIG. 1 shows an upper portion of a materials storeroom having stacking frames 1, 2, which have vertical posts 3, 4 at each end with support arms 5, 6. Stacking frames or shelf systems are typically disposed in alignment beside one another in arbitrary numbers in the direction of the plane of the drawing in FIG. 1, which corresponds to the direction of the storeroom; they extend vertically to the plane of the drawing in FIG. 1 and so crosswise to the storeroom direction as shown in FIG. 2; their length downward is arbitrary, to suit the space available in a given situation.

Via arms 5 engaging the ends of the shelf systems 1, these shelf systems carry self-supporting carriers, in other words carriers that need no further support between their ends, for holding rods and similar material. To this end, the carriers 7, which are also shown in FIG. 2, have U-shaped holders 8 on their face ends with which they are pushed onto the support arms 5. This is shown here by only one example and is equally applicable to other types of carriers for rod-like material.

Opposite the carriers, rods 9 of any material are laid onto the shelves formed by the support arms 6; a plurality of support arms 6 in line with one another or spaced variously apart from one another are provided for each shelf or a shelf system or stacking frame, so that different lengths of material 9 can be carried, as for instance happens when leftover pieces are returned to storage after machining.

A pair of rails 10 extending in the direction of the storeroom is carried by the top of the shelf systems 1, 2; a shelf service apparatus generally identified at 11 and described in detail in U.S. Pat. No. 4,778,325 runs on these rails 10. Only the shelf service apparatus support means 31a that are visible in FIG. 2 will be mentioned here; with their aid, the carrier 7 can be lifted from the support arms 5 and transported along the adjoining shelf system gangway 12 (FIG. 1) to some desired location.

As can be seen from FIGS. 1 and 2, the carrier 7 of FIG. 1 has a certain size and shape in terms of height and width, determined by the size of the shelves embodied by the support arms 5. In accordance with this size and shape of the carriers 7, a certain quantity of rod-like material can be stored with these carriers. Even if only small quantities of some types of rods are needed, then for the sake of automated handling in the materials storeroom, a separate carrier must be used, which accordingly is not filled very full at all, so that the remaining space in it is necessarily wasted.

Similar problems arise for the shelves embodied by the support arms 6, on which the rod-like material 9 rests loosely. In this case, although as FIG. 1 shows, when the materials storeroom is set up a certain amount of attention must be devoted to storing various cross sections of material, nevertheless once these provisions have been made they cannot be changed, and they also are restricted to only a few sizes of shelf, so that as a result, once again only some of the space on each shelf is actually usable.

Figure 3:
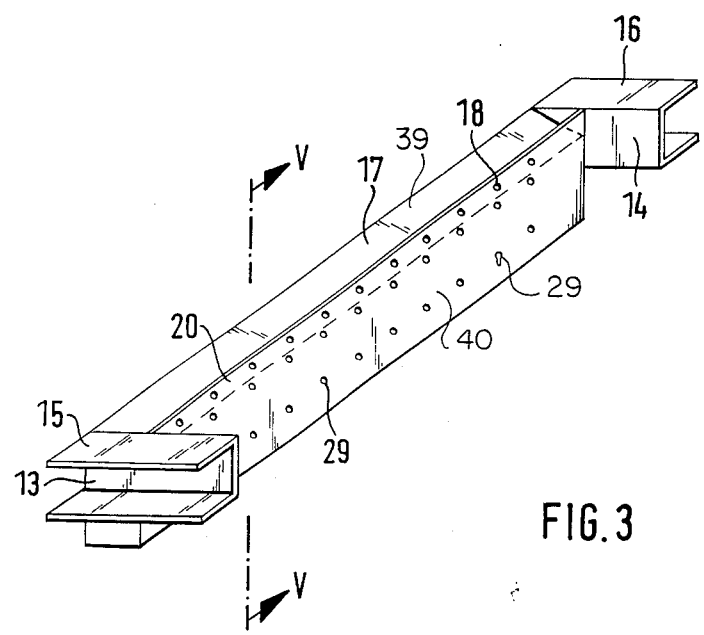
FIG. 3 is a perspective view of the materials carrier according to the invention illustrating a bolt insertion opening in a greater detail.

To overcome these problems, the invention provides the materials carrier, the principle of which is illustrated by FIG. 3. This materials carrier has vertical end closure walls 13, 14 at each end that are in alignment with one another and also has holders 15, 16, protruding horizontally outward from the closure wall; in the present instance the holders are joined to make the U-shaped profile 8 described in conjunction with FIGS. 1 and 2.

The closure walls 13, 14 are self-supportingly connected to one another, on one of their vertical sides, by a girder 17 having vertical walls 40 and 41; the embodiment of this girder and the disposition of the remaining space leaves room available that would otherwise be occupied by the full cross section of the rod-holding carrier 7 of FIGS. 1 and 2.

On the vertical wall 40 facing the space between the closure walls 13, 14, the girder 17 has rows of openings 18, with the aid of which support arms are secured for supporting material, which will be described hereinafter, can be fastened detachably to the vertical wall 17. The girder 17 is positioned within the stacking frame such that the holders 15 and 16 are supported by the support arms 5 on the vertical posts 3, 4. With the holders 15 and 16 supported by the support arms 5 the vertical walls 40 and 41 will be in a vertical position so that the posts 21 with support arms 22 can be secured to the girder 17. Each end of the girder 17 will be supported by vertical posts 3 or 4.

As can be seen, the materials carrier of FIG. 3 may be inserted instead of one of the rod-holding carriers 7 into a corresponding shelf; in terms of the view of FIG. 1, one of the vertical walls of the girder 17 is positioned immediately adjacent to the shelf posts 3.

Figure 4:
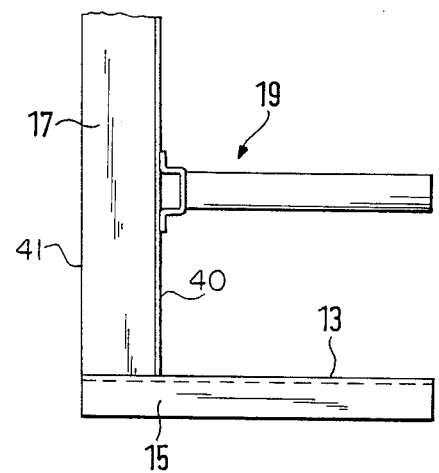
FIG. 4 is a partial detailed plan view of the materials carrier of FIG. 3.

FIG. 4 is a fragmentary top view of the materials carrier of FIG. 3, with a support 19 fastened to it; the support will be described in detail hereinafter.

Figure 5:
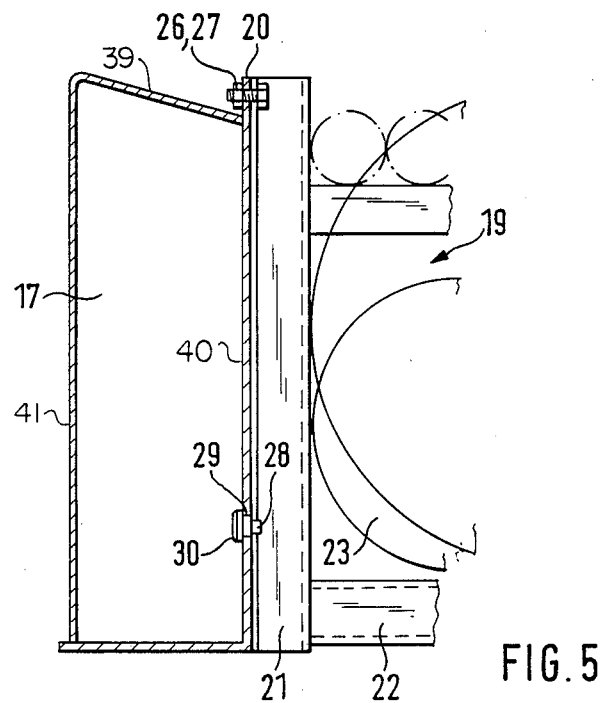
FIG. 5 is a sectional view taken along the line V—V of FIG. 3 further illustrating an arm support with spaced support arms attached thereto.

FIG. 5 is a sectional view of the materials carrier of FIG. 3, taken along the line V—V of FIG. 3. As this sectional view shows, the girder 17 is embodied as a hollow-profiled girder, which may be made from sheet metal, for instance by welding. The cross section is embodied such that on the side facing the space between the closure walls 13, 14, the vertical wall has a web 20 or an end that extends above an upper wall closure 39 that closes the girder off at the top; as FIG. 3 shows, this web 20 may also be provided with openings 18 to which supports may be attached. The vertical wall including the web 20 may be made as one continuous wall such that the upper end extends beyond the upper wall of the girder.

Figure 6:
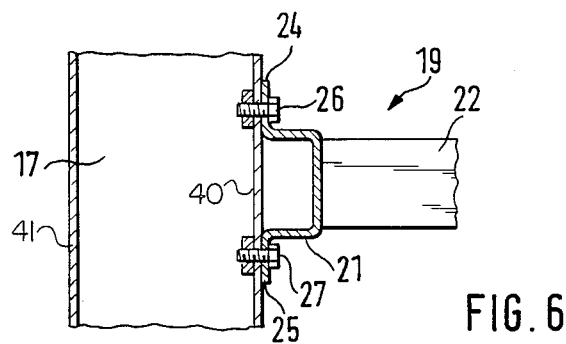
FIG. 6 is a partial cross-sectional view illustrating the support arms of FIG. 5 connected to the girder of FIG. 1.

FIGS. 5 and 6 also show that the supports 19 comprises a post 21, which can be fastened vertically on a vertical wall of girder 17; from this post 21, at least one support arm 22, on which material 23 can be received, protrudes horizontally into the space between the closure walls 13, 14 and parallel thereto.

The fastening of the post 21 to the vertical wall of girder 17 is effected via the flanged strips 24, 25 and by screws 26, 27 passing through the openings 18 of the web 20. Bolts 28 are also secured in captive fashion farther down in the flanged strips 24 and 25; the bolts are inserted into openings 29 and locked in place there with their terminal heads 30; to this end, the openings 29 have an upper cross section that narrows from the upper circular portion to a narrow downward extending opening which has a size of the diameter of the bolt so that the bolt head will lock behind the narrow opening when moved toward the bottom of the narrow opening, so that the bolts 28 can be hooked into them in the manner of a bayonet mount. In this way, the post 21 can easily be mounted on the vertical wall of girder 17 with the aid of the bolt 28 first, and then finally fastened there with the aid of the screws 26 and 27. As many posts 21 and support arms 22 as desired may be secured along the rail 17 to accommodate short or long rods, etc.

Figure 7:
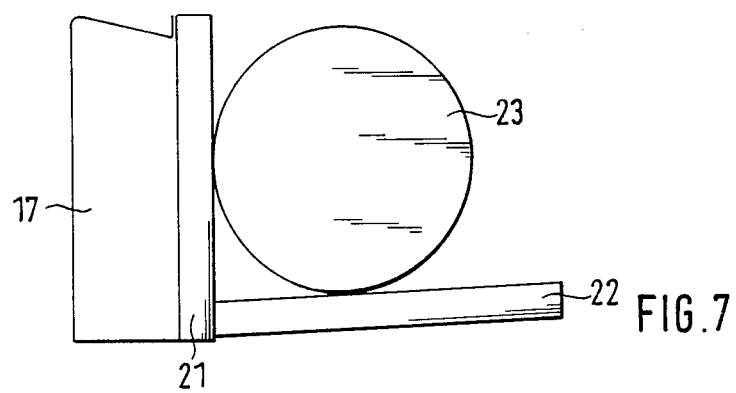
FIGS. 7–11 are simplified illustrations of various kinds of supports for the material.
Figure 8:
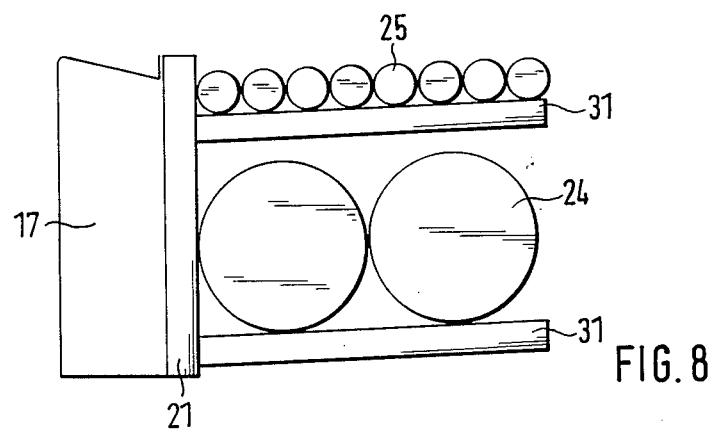
Figure 9:
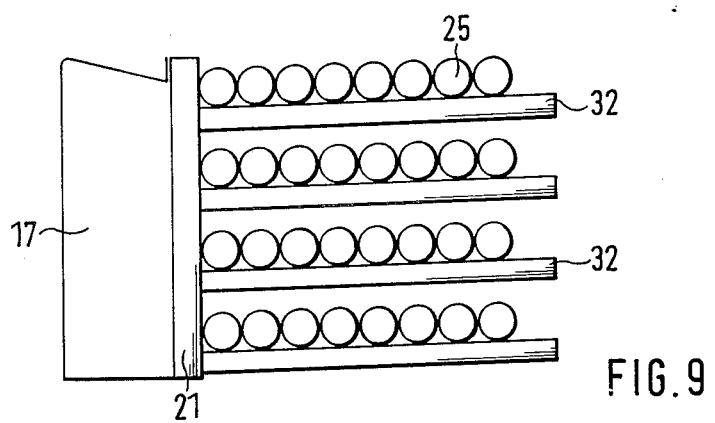

FIGS. 7–9 show how the supports, described in detail in conjunction with FIGS. 4–6, for material can be variously equipped with one or more support arms 22 or 31 or 32, disposed one above the other, depending on the diameter and length of the rod-like material 23 or 24 or 25 that is to be stored. This makes it clear that identical as well as reusable material carriers of the kind shown in FIG. 3 can be used for various applications, with optimal utilization of storeroom space, by using materials supports that are structurally simple and can therefore be manufactured inexpensively for an intended application.

Figure 10:
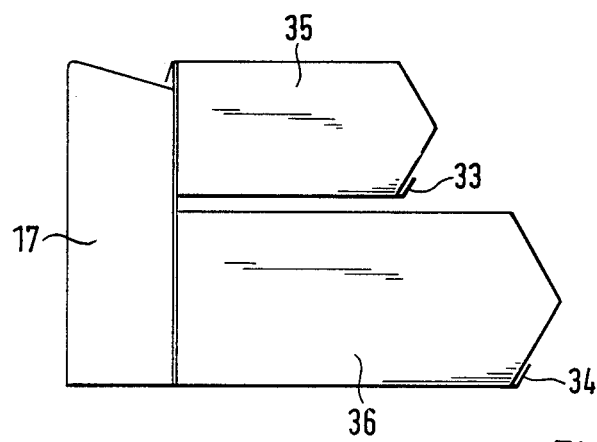

FIG. 10 shows that with the aid of the materials carrier of the invention, materials other than rod-like materials can be stored as well. In the example shown, sheet metal carriers 33, 34 are suspended from a vertical wall 40 of girder 17, or otherwise (not shown) secured to it, for instance with screws; storage cases 35, 36 intended for storing small iron parts, for example, can then be mounted on the carriers.

Figure 11:
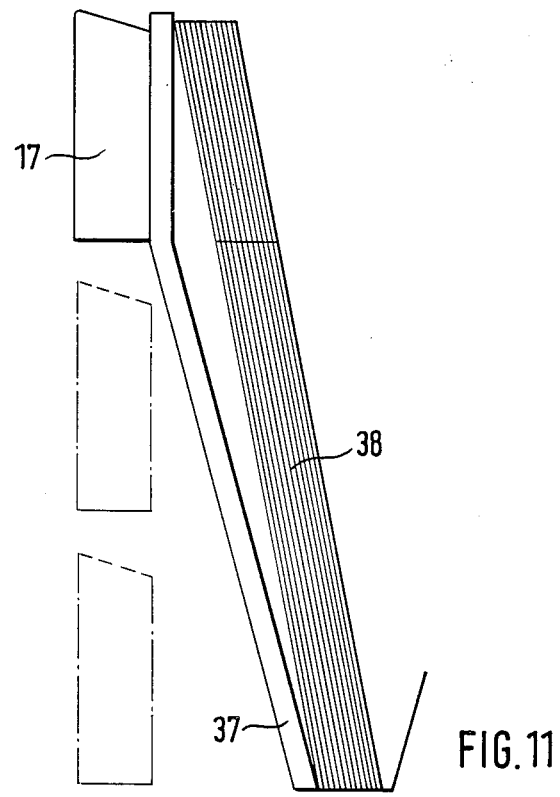

FIG. 11, finally, shows one example of a support 37, fastened to a vertical wall of girder 17. The height of these supports spans a plurality of shelves, so that by using these supports 37, even correspondingly large-sized parts, such as metal sheets 38 shown, can be kept on hand. The shelves that are spanned are represented as girders, shown in dashed lines, in the manner of the girders 17, although it will be appreciated that such vertical walls will not be present at those particular spanned positions.

The above description of the subject of the invention made in conjunction with FIGS. 3–11 relates solely to a girder 17 having parallel vertical walls that is secured at its ends on one of the vertical sides of the closure walls 13, 14. As already emphasized in the background section, the girder 17 may also be disposed in the vicinity of the middle between the vertical sides of the closure walls 13, 14, and in that case may be provided with suitable elements on its vertical wall 41 for detachably securing material holders. Especially for a materials carrier that has been taken out of the shelf, this makes it possible for the shelf service apparatus or other equipment to handle the material held in it from both sides of the carrier.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An elongated self-supporting removable material carrier (17) comprising at least one vertical wall and two opposite ends, a respective U-shaped holder secured to each of said opposite ends of said material carrier, said U-shaped holders including vertical terminal end walls (13, 14) aligned with one another in a longitudinal direction of said material carrier and horizontally extending pairs of holder flanges (15, 16) that protrude outwardly from said vertical terminal end walls (13, 14) for supporting said material carrier on horizontal carrier arms (5) of a stacking frame including vertical supports (3, 4) that form a shelving unit (12) from which and to which said material carrier can be transported, said terminal end walls (13, 14) are connected to opposite ends of said material carrier in a self-supporting manner exclusively to said at least one vertical wall, said at least one vertical wall includes upper and lower aligned rows of openings (18, 29) and a vertical wall end extension (20) facing a space between the terminal walls for easily securing spaced supports (19, 33, 34, 37) onto said material carrier and easily detaching the same therefrom.

2. A material carrier as defined by claim 1, in which said U-shaped holders are connected to said material carrier in the vicinity of the middle of their length between their vertical side, and said material carrier is provided on two vertical walls with the apertures (18, 29) for attaching and detachably fastening said spaced supports for the material to be carried.

3. A materials carrier as defined by claim 1, in which one of the rows of openings (18) are disposed in each end extension (20).

4. A materials carrier as defined by claim 1, which includes spaced vertical fastening posts (21) secured to said at least one vertical wall of said material carrier (17) and support arms (22, 31, 32) are secured to said posts (21) and extend substantially horizontally into the space between said U-shaped holders.

5. A materials carrier as defined by claim 1, in which said material carrier (17) is embodied as a hollow-profiled metal girder.

6. A materials carrier as defined by claim 2, in which said material carrier (17) is embodied as a hollow-profiled metal girder.

7. A materials carrier as defined by claim 1, in which said openings of at least one of the rows has a cross section that narrows vertically.

8. A materials carrier as defined by claim 5, in which said openings of at least one of the rows has a cross section that narrows vertically.

9. A materials carrier as defined by claim 7, in which said openings (29) having a cross section that narrows vertically is the bottom most row.

10. A materials carrier as defined by claim 4, in which said posts (21) have a cap-shaped horizontal profile cross section including flanged strips (24, 25) and are connected to said material carrier via fastening means guided through bores of their flanged strips (24, 25) and secured to the openings (18, 29) of the material carrier.

* * * * *